US011960368B1

(12) United States Patent
Verhoeven

(10) Patent No.: US 11,960,368 B1
(45) Date of Patent: Apr. 16, 2024

(54) COMPUTER-IMPLEMENTED SYSTEM AND METHOD FOR RECOVERING DATA IN CASE OF A COMPUTER NETWORK FAILURE

(71) Applicant: PANIK BUTTON HOLDING B.V., Oosteind (NL)

(72) Inventor: Albertus Andreas Verhoeven, Oosteind (NL)

(73) Assignee: PANIK BUTTON HOLDING B.V., Oosteind (NL)

( * ) Notice: Subject to any disclaimer, the term of this patent is extended or adjusted under 35 U.S.C. 154(b) by 0 days.

(21) Appl. No.: 18/147,291

(22) Filed: Dec. 28, 2022

(30) Foreign Application Priority Data

Nov. 7, 2022 (NL) ..................................... 2033475

(51) Int. Cl.
*G06F 11/20* (2006.01)
*G06F 21/53* (2013.01)

(52) U.S. Cl.
CPC .......... *G06F 11/2007* (2013.01); *G06F 21/53* (2013.01); *G06F 2201/805* (2013.01); *G06F 2221/034* (2013.01)

(58) Field of Classification Search
CPC .................. G06F 11/2007; G06F 21/53; G06F 2201/805; G06F 2221/034
See application file for complete search history.

(56) References Cited

U.S. PATENT DOCUMENTS

| 11,100,217 | B1 | 8/2021 | Natanzon | |
|---|---|---|---|---|
| 2008/0016387 | A1* | 1/2008 | Bensinger | G06F 11/1446 714/4.11 |
| 2013/0111260 | A1 | 5/2013 | Reddy | |
| 2019/0087278 | A1 | 3/2019 | Almog | |
| 2021/0124826 | A1* | 4/2021 | Matsuda | G06F 21/6218 |

OTHER PUBLICATIONS

Netherlands Search Report issued in Netherlands Patent Application No. 2033475, dated May 8, 2023, 9 pages.

* cited by examiner

*Primary Examiner* — Beemnet W Dada
(74) *Attorney, Agent, or Firm* — Heslin Rothenberg Farley & Mesiti P.C.; Jacquelyn A. Graff, Esq.

(57) ABSTRACT

The invention relates to a computer-implemented system for recovering data in case of a computer network failure. The invention also relates to a computer-implemented method for recovering data in case of a computer network failure, preferably by making use of the computer-implemented system according to the invention. The invention further relates to a non-transitory computer-readable program storage device, comprising computer readable instructions executable by one or more processors to perform the computer-implemented method according to the invention.

20 Claims, 3 Drawing Sheets

COMPUTER-IMPLEMENTED SYSTEM AND METHOD FOR RECOVERING DATA IN CASE OF A COMPUTER NETWORK FAILURE

CROSS REFERENCE TO RELATED APPLICATIONS

This application claims priority under 35 U.S.C. § 119 to Netherlands Patent Application No. NL 2033475, filed Nov. 7, 2022, which is incorporated herein by reference in its entirety.

FIELD OF INVENTION

The invention relates to a computer-implemented system for recovering data in case of a computer network failure, for example in case of a ransomware attack and/or power failure. The invention also relates to a computer-implemented method for recovering data in case of a computer network failure, preferably by making use of the computer-implemented system according to the invention. The invention further relates to a non-transitory computer-readable program storage device, comprising computer readable instructions executable by one or more processors to perform the computer-implemented method according to the invention.

BACKGROUND

One type of malicious software (malware) that affects computers today is known as ransomware. This type of software, if given access to a computer system, may use encryption on the contents of a data server (possibly including networked files). Once encrypted, the original data may be no longer accessible by its legitimate users. As such, a system user who lacks decryption keys will no longer be able to readily access his or her data. Once the original data has been encrypted and the non-encrypted version is deleted, a system user may be contacted with a demand from a malicious party who has breached system security with ransomware. Frequently, the malicious party will demand that the user pay him an amount in crypto-currency, such as Bitcoins, in order to have the user's files decrypted so that they are accessible again. Typically, if the user does not pay, then the files may remain encrypted and inaccessible. Unless the user has a good backup system, large amounts of data may be lost, often leading to significant financial damage, commercial damage, reputational damage and an interruption of the business continuity. Furthermore, even if a backup system is in place, data could still be lost as files that have been encrypted by ransomware may be automatically backed up in encrypted form. Depending on data retention schemes, a backup of non-affected, clean data could even be overwritten by ransomware-encrypted data. Thus, consumers and small businesses may be hit particularly hard by ransomware, as these entities often do not have good data backup policies. Even if backup data exists, replacing the entire contents of a hard drive or other storage device may be a slow process. For a business, replacing lost data from backup, in case the backup would not be affected and if possible in the given circumstances (which is not always the case), may also mean halting or reducing operations while the data is restored. Hence, unchecked ransomware has a large potential to be destructive and impact system uptime and productivity. Detecting ransomware operations at an early stage, however, may allow its effects to be mitigated or prevented. However, unfortunately most users are still vulnerable for ransomware attacks these days.

SUMMARY

It is a first object of the invention to provide and improved computer-implemented system and/or method to recover data in case of a computer network failure, such as a ransomware attack or power failure.

It is a second object of the invention to provide and improved computer-implemented system and/or method to relatively quickly recover data in case of a computer network failure, such as a ransomware attack or power failure.

It is a third object of the invention to provide and improved computer-implemented system and/or method to relatively quickly recover data in case of a data server failure due to a ransomware attack.

It is a fourth object of the invention to provide and improved computer-implemented system and/or method to relatively quickly and safely recover data in case of a computer network failure, such as a ransomware attack or power failure.

At least one of these objects can be met by providing a computer-implemented system according to the invention, comprising:
- at least one computer network of a customer, said computer network comprising at least one data server and at least one client device configured to connect with said data server,
- at least one fallback tenant associated with said customer, comprising:
  - at least one backup server configured to store in at least one secure data container predefined backup data initially stored on said data server,
  - preferably at least one processor, and
  - at least one non-transitory computer-readable program storage device storing working environment installation instructions which when executed, cause at least one processor, preferably of the fallback tenant and/or at least one, preferably authorized, external processor, to automatically build a new digital working environment for said customer, based upon and/or giving access to at least a part of the backup data stored on the backup server,
- preferably at least one sandboxed environment situated in between the customer's computer network and the fallback tenant to investigate the safety of backup data and to transmit safety approved backup data to at least one fallback tenant for storing of said safety approved backup data onto at least one backup server of said at least one fallback tenant, and
- at least one emergency switch controllable by said customer and/or the customer's computer network, in particular in case of a customer's computer network failure and/or in case of a customer's data server failure, configured to execute the working environment installation instructions of the at least one fallback tenant of said customer, causing the at least one processor of said fallback tenant to automatically build a customer accessible new digital working environment based upon and/or giving customer access to at least a part of the backup data stored on the backup server.

DETAILED DESCRIPTION

The computer-implemented system according to the invention makes use of an inoperative backup server containing all (predefined) data which are needed to build, after switching or activating the emergency switch, typically in case of emergency, a new digital working environment for the customer. The new digital working environment may be a fully operational environment, but may also be a basic working environment with basic functionality to continue the business at a basic level, while preferably recreating a fully operational environment in the background. Since the shadow working environment is non-existing prior to switching the emergency switch, and hence non-operational and non-accessible, this shadow environment cannot be accessed and encrypted by malicious parties.

Since all data stored on the backup server(s) are screened and safety approved in a sandboxed environment, the data stored on the backup server(s) are clean and non-affected. By storing all predefined data in such a way that the new working environment can be created and built relatively quickly (e.g. within 1 hour), the business interruption for the customer can be kept to a negligible minimum. The—typically temporary—new working environment gives the customer access (again) to at least a part of its data, but may also be configured as communication platform and/or collaboration platform. In case of a ransomware attack or other permanent failure, preferably the affected data server(s) are wiped and/or replaced to restore the original full-functional working environment again, which may takes several weeks, typically 10 to 12 weeks.

The customer's computer network may comprise one or more data servers and one or more client devices, such as computers (PCs), tablets, smartphones, etcetera. Each client device is preferably configured to connect to one or more of said data servers. This customer's computer network is typically connected to the Internet and may be at least partially cloud-based. The customer's computer network is normally protected by means of a firewall which makes part of the computer network. The customer's computer network is preferably entirely isolated from the fallback tenant. However, the fallback tenant is periodically, for example daily, filled and updated with new predefined data originating from at least one data server of the customers computer network and screened and approved by the sandboxed environment. Hence, the sandboxed environment is normally situated in between the customer's computer network and the fallback tenant. The sandboxed environment, also referred to as cleaning room, may be a cloud-based environment and/or typically uses one or more virtual servers to test data in an isolated environment. In the sandboxed environment all incoming data is sandboxed, which means that the safety of said data is investigated in an isolated environment. Hence, the sandboxed environment constitutes a safe and isolated environment that is decoupled from the surrounding infrastructure and OS, and hence decoupled from the customer's computer network as well as the fallback tenant, with the objective of testing data, in particular testing code and analysing malware. It is intended to prevent the potential threat from entering the fallback tenant and is commonly used to scrutinize unknown or non-secure code. Sandboxing confines the script to a test environment, preventing it from infecting or harming the host device or operating system. As the name implies, this confined test environment functions as something of a "sandbox," in which you can experiment with various variables to see how the system works. It is also a secure environment where anything that goes wrong cannot directly hurt your host machines of the customer's computer network and/or the fallback tenant(s).

The customer is typically a company, but may also be a private person. The customer is called customer as the customer normally buys, leases, uses and/or subscribes to the fallback tenant and/or an associated service offered by a—normally third party—service provider. Dependent on the situation, the customer may also be referred to as a corporate entity, a company, a corporate party, a legal person, a natural person, and/or as a private person.

The fallback tenant is considered as a restricted environment associated with the customer, and preferably only with that customer. The backup server of the fallback tenant may also be referred to as single tenant backup server. Hence, preferably, each customer has its own one or more backup servers. The backup server may be physical servers and/or virtual servers. It is imaginable that the hardware components of the tenant environment may comprise components, such as processor and storage media, including physical servers, which are simultaneously used for operating a plurality of tenants associated with a plurality of the customers, respectively. Each fallback tenant may comprises one or more processors and/or may be configured to co-act and/or communicate with at least one external processor, in particular at least one authorized external processor.

Preferably, the system, more preferably the customer's computer network, comprises at least one processor and at least one non-transitory computer-readable program storage device storing predefined backup data instructions associated with backup data to be stored on at least one backup server of at least one customer's fallback tenant, which when executed, cause the at least one processor to copy and transmit at least a part of the predefined backup data (in)to said at least one sandboxed environment. The at least one non-transitory computer-readable program storage device storing predefined backup data instructions may also be stored at a location at a distance from the customer's computer network, and may, for example, by accessible by one or more authorized users and/or consultants of said customer, preferably by making use of one or more, optionally authorized, client devices. Preferably, the backup data instructions are stored on a preparatory server which is separated from said data server. The preparatory server is considered as an example of a non-transitory computer-readable program storage device. The preparatory server may be an on-premise server or a cloud-based server. The preparatory server may be a physical server or a virtual server. Preferably, at least client device and/or at least one user of the customer's computer network has controlled access to at least a part of the preparatory server, preferably based upon prior user authentication, which may be multi-factor authentication.

It is imaginable that at least a part of the new working environment is already installed on the backup server without having switched the emergency switch(es). Preferably, in this latter case, the pre-installed working environment is a non-functional and/or non-accessible working environment to shield this working environment as robustly as possible from unauthorized persons. The predefined backup data and/or the backup data stored onto at least one backup server preferably comprises data to build and/or install at least one operating system (OS) and/or at least one virtual machine (VM) emulating at least one operating system. In the new working environment to be built such an OS, such as Microsoft Windows, Apple macOS, Google's Android OS, etcetera, will commonly be needed to access further data, like applications and user files. Preferably, the predefined backup data and/or the backup data stored onto at least one backup server comprises data to build and/or install at least one user application, such as, for example, word processing software, a spreadsheet, a presentation program, a personal information manager, a personal task manager, a personal contact manager, an email client, at least one web browser, and/or anti-malware software.

Preferably, the predefined backup data and/or the backup data stored onto at least one backup server comprises user files. The user files may be stored in a predefined folder structure which may corresponds to a folder structure used on the original data server of the customer's computer network. Individual user files be assigned access rights. These file related permissions may also be in line with the permissions as set for the original files as stored on the data server(s) of the customer's computer network.

In a preferred embodiment, the customer's computer network comprises a plurality of client devices, wherein the predefined backup data and/or the backup data stored onto at least one backup server comprises client device access related data determining access rights of said plurality of client device to access the new digital working environment once built. These client device access related data leads to a permission structure on client device level. This allows specific client devices (or device types) to be granted or denied specific access rights to specific files, folders, or servers.

Preferably, one or more of the aforementioned permissions can be adjusted and/or set by one or more authorized users of the customer's computer environment.

Preferably, the customer's computer network comprises a plurality of client devices associated with different users of said computer network, wherein the predefined backup data and/or the backup data stored onto at least one backup server comprises data to create at least one digital communication room allowing at least two of said different users to digitally communicate with each other. At least one of these rooms may be configured to as (crisis) war room, wherein preferably only selective key persons of the customer may be given access to this war room. This facilitates quick communication between the key persons to solve an actual crisis as efficiently as possible.

Preferably, the predefined backup data and/or the backup data stored onto at least one backup server comprises data to create at least one fallback website associated with said customer.

The predefined backup data and/or the backup data stored onto at least one backup server preferably comprises data comprising said working environment installation instructions. In this case, said backup server is considered as non-transitory computer-readable storage device.

In order to save storage space and costs, preferably at least a part of the backup data is stored in a compressed manner. Preferably, at least a part of the backup data is stored in an encrypted manner. Preferably all backup data sent from the customer's computer network, via the sandboxing environment, to the fallback tenant(s) is transported in an encrypted manner. This leads to an additional level of protection, which makes it more hard for unauthorized, malicious persons to intercept and misuse (these) data.

At least a part of at least one the emergency switch is a physical switch, in particular a physical button, which may be pushed to switch or activate the switch. Additionally or alternatively, at least a part of at least one the emergency switch may be a virtual switch. The virtual switch may be switched by the customer, and/or the customer's computer network, and/or an authorized external service provider, optionally upon request of the customer.

Preferably, switching the switch to activate the fallback tenant to build the new working environment, and possibly to be disconnected from the present data server(s) and/or from the sandbox environment, is subjected to a specific protocol to prevent accidentally and/or unintentionally switching the switch. Such a protocol may for example be based upon a multiple step protocol, wherein each step, optionally in a predefined order, should be carried out before the switch is actually switched. A preferred protocol in this case may be a so-called "break glass" protocol, which requires a combination of at least two access tokens and/or at least two handlings in order to metaphorically break the glass and switch the switch. Here, for example, a key to switch an emergency switch may be made from two parts. One key part is used by the customer and the other key part may be stored for example in a secure storage container to which the customer and/or the customer's computer network and/or an authorized service provider has or can gain access to. Preferably, the system comprises at least one first digital break-glass access token stored in at least one break-glass file, preferably in a customer's computer network, required to switch the emergency switch. At least one, preferably each, emergency switch is programmed to be switched when subjected to at least two predefined activation steps. Preferably, at least one predefined activation step is defined by exposing the switch to at least one first digital break-glass access token. Preferably, at least one predefined activation step is defined by receiving at least one second digital break-glass access token stored and/or held by the customer, preferably at a distance from a first digital break-glass access token required to activate said switch. It is additionally or alternatively also imaginable that at least one predefined activation step is defined by physically switching said physical switch (if applied) by at least one user, preferably at least one authorized user.

Additionally or alternatively to the above embodiment wherein the fallback tenant(s) may be activated by manually and/or automatically switching at least one emergency switch, it is imaginable that fallback tenant(s) may be activated and/or opened, optionally without using the switch, by executing an emergency protocol and/or a(nother) "break-glass protocol requiring a plurality of handlings and/or tokens to force access to and/or activation of the fallback tenant. These handlings may require action from a plurality of persons. In general, the tokens may be stored and/or generates at different places and/or may be controlled by different persons, for example both the customer and at least one authorized service provider.

It is imaginable that at least one secure data container of at least one backup server is initially digitally sealed and is merely accessibly by switching at least one emergency switch. Such a seal may e.g. be formed by a firewall shielding the backup server(s).

The computer-implemented system and method according to the invention are primarily directed to quick and safe data recovery in case of failure and/or inaccessibility of the data server(s) (or one or more other critical parts of the customer's computer network), for example due to the a ransomware attack. In this case, it is preferred that the customer's computer network and/or at least one emergency switch is programmed to disconnect the data server(s) and/or from the sandbox environment after switching of at least one emergency switch in order to activate the fallback tenant to build the new working environment. However, in case of a more innocent failure, like a power failure, such a data server decoupling may be omitted. It is imaginable that the system comprises at least one switch to be used in case of a ransomware attack and at least one other switch to be used in case of a more innocent failure, such as a power failure. It is also imaginable that different protocols can be applied to the same switch, wherein a ransomware attack protocol leads to disconnection of the data server(s) and/or from the sandbox environment while a more general emergency protocol does not lead to disconnection of the data server(s) and/or from the sandbox environment.

Preferably, the system, in particular the customer's computer network, is programmed to issue at least one warning alert to users of the customer's computer network and/or to at least one predefined external party, such as an (authorized) service provider, once the emergency switch is switched. This typically encourages the persons and parties involved to undertake adequate action as soon as possible in terms of partial data recovery, full environment recovery, business continuity, risk reduction, etcetera.

In a preferred embodiment, the system, in particular the customer's computer network, comprises at least one running Security Information and Event Management (SIEM) service and/or at least one running Security Operations Centre (SOC) service to monitor unusual network activity on and/or in the periphery of the customer's computer network and/or within the newly built working environment (built after activation of the fallback tenant). The SIEM service and/or SOC service may be installed on or within the customer's computer network and/or the newly created working environment. Additionally or alternatively, ther SIEM service and/or SOC service may be an external(ly hosted) service, for example hosted by an authorized service provider, which external service(s) being configured to monitor the customer's computer network and/or the newly created environment (once created). Preferably, at least one SIEM service and/or at least one SOC service is/are configured to detect and stop insider cybersecurity threats, preferably one or more threats selected from the group consisting of: compromised user credentials, anomalous privilege escalation, malware, compromised user accounts, and encryption of large amounts of data by ransomware. Preferably, at least one SIEM service and/or at least one SOC service is/are configured issue a warning signal to at least one predefined user of the customer's computer network and/or to at least one external party in case of a detected cybersecurity threat. Preferably, at least one SIEM service and/or at least one SOC service is/are configured to generate and/or release at least one part of an access token required to switch at least one emergency switch.

Security information and event management (SIEM) is a multipurpose security management protocol that combines security information management (SIM) and security event management (SEM). SIEM uses historical as well as real-time correlation software to keep track of security data logs, allowing the customer and/or the customer's computer network to troubleshoot historical threats as well as to flag new security issues as they occur. Typically, data logs document any unusual activity that occurs in your network. Because all network activity is normally collected in the data log, it is one of the most effective tools for detecting threats that may have managed to sneak through commonly used lines of defence. SIEM SOC often get grouped together. While SIEM is a kind of technology that allows security analysts to discover and act on suspected threats, a SOC encompasses not only the technology but also the users and processes involved in monitoring the customer's computer network, searching for threats, and responding to incidents. As indicated above, in case unusual behaviour is detected by the SIEM and/or SOC, preferably which exceeds a predefined threshold deviation, an access token may be generated and/or released which as such may activate (switch) an emergency switch and/or which may be combined with at least one other access token or activation step in order to activate (switch) an emergency switch.

It is imaginable, additionally or alternatively to the embodiments presented above, that at least one emergency switch is programmed to be controlled by an external party, such as an authorized service provider, preferably upon an authenticated request of said customer.

The invention also relates to a computer-implement method for recovering data in case of a computer network failure, preferably by making use of a system according to any of the preceding claims, comprising the steps of:

A) Predefining backup data of data stored on at least one data server of a customer's computer network, B) Optionally investigating the safety of said predefined backup data in a sandboxed environment, C) Copying the predefined backup data which are preferably investigated and safety approved during step B) to at least one backup server of at least one fallback tenant, D) Providing at least one emergency switch, E) Allowing, preferably conditionally, said customer and/or said customer's computer network to switch at least one emergency switch, F) Following switching of at least one emergency switch executing working environment installation instructions stored on at least one non-transitory computer-readable program storage device of said fallback tenant to cause at least one processor of said fallback tenant to automatically build a new digital working environment for the customer, at least partially based upon the predefined backup data stored on at least one backup server, and G) Giving the customer, preferably one or more client devices of said customer, access to said new digital working environment.

Advantages and embodiments of the computer-implemented method have been described above already in an extensive manner. Further embodiments are presented below.

Preferably, during step A) predefined backup data instructions associated with backup data to be stored on at least one backup server of at least one customer's fallback tenant are stored on at least one non-transitory computer-readable program storage device, preferably of the customer's computer network, which when executed, cause the at least one processor to copy and transmit at least a part of the predefined backup to said at least one sandboxed environment. More preferably, during step A) said backup data instructions are stored on a preparatory server which is separated from said data server. Preferably, during step A) at least client device and/or at least one user of the customer's computer network has controlled access to at least a part of the preparatory server, preferably based upon prior user authentication.

Preferably, the backup data predefined during step A) and/or the backup data stored onto at least one backup server during step C) comprises data to build and/or install at least one operating system (OS) and/or at least one virtual machine (VM) emulating at least one operating system. Preferably, the backup data predefined during step A) and/or the backup data stored onto at least one backup server during step C) comprises data to build and/or install at least one user application, such as word processing software, a spreadsheet, a presentation program, a personal information manager, a personal task manager, a personal contact manager, an email client, at least one web browser, and/or anti-malware software. Preferably, the backup data predefined during step A) and/or the backup data stored onto at least one backup server during step C) comprises user files. Preferably, the customer's computer network comprises a plurality of client devices, wherein the backup data predefined during step A) and/or the backup data stored onto at least one backup server during step C) comprises client device access related data determining access rights of said plurality of client device to access the new digital working environment once built. Preferably, the customer's computer network comprises a plurality of client devices associated with different users of said computer network, wherein the backup data predefined during step A) and/or the backup data stored onto at least one backup server during step C) comprises data to create at least one digital communication room allowing at least two of said different users to digitally communicate with each other. Preferably, the backup data predefined during step A) and/or the backup data stored onto at least one backup server during step C) comprises data to create a fallback website associated with said customer.

In a preferred embodiment during step C) at least a part of the backup data is stored in a compressed and/or encrypted manner.

Preferably, at least a part of at least one the emergency switch provided during step D) is a physical switch, in particular a physical button, and/or wherein at least a part of at least one the emergency switch provided during step D) is a virtual switch.

The system preferably comprises at least one first digital break-glass access token stored in at least one break-glass file and/or break-glass database, preferably in a customer's computer network, required to switch the emergency switch during step E).

During step E) preferably at least one, preferably each, emergency switch is programmed to be switched when subjected to at least two predefined activation steps. More preferably, at least one predefined activation step is defined by exposing the switch to at least one first digital break-glass access token.

Preferably, at least one predefined activation step is defined by receiving at least one second digital break-glass access token stored and/or held by the customer, preferably at a distance from a first digital break-glass access token required to activate said switch. Preferably, at least one predefined activation step is defined by physically switching said switch by at least one user, preferably at least one authorized user. Preferably, at least one secure data container of at least one backup server is initially digitally sealed, preferably during step C), and is merely accessibly by switching at least one emergency switch during step E).

In a preferred embodiment of the computer-implemented method according to the invention, switching the emergency switch during step E) is at least partially triggered by monitored unusual behaviour of and/or on the data server, like a ransomware attack on the data server and/or a power failure of the data server.

Preferably, during or after step E), the one or more client devices are disconnected from the data server, in particular in case of a ransomware attack is detected and/or observed by the customer and/or the customer's computer network and/or an authorized service provider.

Preferably, the customer's computer network is programmed to issue, during and/or after step E), at least one warning alert to users of the customer's computer network and/or to at least one predefined external party once the emergency switch is switched.

In a preferred embodiment, the method comprises step H) comprising detecting insider cybersecurity threats and/or unusual network activity on the customer's computer network, in particular on and/or of the data server, by means of at least one Security Information and Event Management (SIEM) service and/or at least one Security Operations Centre (SOC) service, preferably running on said customer's computer network and/or, for example, hosted by an external service provider, wherein, preferably, one or more monitored threats is/are selected from the group consisting of: compromised user credentials, anomalous privilege escalation, malware, compromised user accounts, and encryption of large amounts of data by ransomware. Preferably, during step H) at least one SIEM service and/or at least one SOC service issues at least one warning signal to at least one predefined user of the customer's computer network and/or to at least one external party in case of a detected cybersecurity threat. Preferably, during step H) at least one SIEM service and/or at least one SOC service generates and/or releases at least one part of an access token required to switch at least one emergency switch during step E).

The invention furthermore relates a non-transitory computer-readable program storage device (NPSD) comprising computer readable instructions executable by one or more processors to perform the computer-implemented method according to the invention and/or for use in the computer-implemented system according to the invention. The NPSD may include magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory and storage may be used to retain computer program instructions or code organized into one or more modules and written in any desired computer programming language. When executed by a processor, such computer program code may implement one or more of the methods or processes described in this document. A power source of the NPSD may comprise a rechargeable battery (e.g., a lithium-ion battery, or the like) or other electrical connection to a power supply, e.g., to a mains power source, that is used to manage and/or provide electrical power to the electronic components and associated circuitry of electronic device.

Preferred embodiments of the invention are set out in the following non-limitative set of clauses:

CLAUSES

1. Computer-implemented system for recovering data in case of a computer network failure, comprising:
    at least one computer network of a customer, said computer network comprising at least one data server and at least one client device configured to connect with said data server,
    at least one fallback tenant associated with said customer, comprising:
        at least one backup server configured to store in at least one secure data container predefined backup data initially stored on said data server,
        preferably at least one processor, and
        at least one non-transitory computer-readable program storage device storing working environment installation instructions which when executed, cause at least one processor, preferably of the fallback tenant, to automatically build a new digital working environment for said customer, based upon and/or giving access to at least a part of the backup data stored on the backup server, at least one sandboxed environment situated in between the customer's computer network and the fallback tenant to investigate the safety of backup data and to transmit safety approved backup data to at least one fallback tenant for storing of said safety approved backup data onto at least one backup server of said at least one fallback tenant, and at least one emergency switch controllable by said customer and/or the customer's computer network, in particular in case of a customer's computer network failure and/or in case of a customer's data server failure, configured to execute the working environment installation instructions of the at least one fallback tenant of said customer, causing the at least one processor of said fallback tenant to automatically build a customer accessible new digital working environment based upon and/or giving customer access to at least a part of the backup data stored on the backup server.

2. Computer-implemented system according to clause 1, wherein the customer's computer network comprises at least one processor and at least one non-transitory computer-readable program storage device storing predefined backup data instructions associated with backup data to be stored on at least one backup server of at least one customer's fallback tenant, which when executed, cause the at least one processor to copy and transmit at least a part of the predefined backup data to said at least one sandboxed environment.

3. Computer-implemented system according to clause 2, wherein the backup data instructions are stored on a preparatory server which is separated from said data server.

4. Computer-implemented system according to clause 3, wherein at least client device and/or at least one user of the customer's computer network has controlled access to at least a part of the preparatory server, preferably based upon prior user authentication.

5. Computer-implemented system according to any of the preceding clauses, wherein the predefined backup data and/or the backup data stored onto at least one backup server comprises data to build and/or install at least one operating system (OS) and/or at least one virtual machine (VM) emulating at least one operating system.

6. Computer-implemented system according to any of the preceding clauses, wherein the predefined backup data and/or the backup data stored onto at least one backup server comprises data to build and/or install at least one user application, such as word processing software, a spreadsheet, a presentation program, a personal information manager, a personal task manager, a personal contact manager, an email client, at least one web browser, and/or anti-malware software.

7. Computer-implemented system according to any of the preceding clauses, wherein the predefined backup data and/or the backup data stored onto at least one backup server comprises user files.

8. Computer-implemented system according to any of the preceding clauses, wherein the customer's computer network comprises a plurality of client devices, wherein the predefined backup data and/or the backup data stored onto at least one backup server comprises client device access related data determining access rights of said plurality of client device to access the new digital working environment once built.

9. Computer-implemented system according to any of the preceding clauses, wherein the customer's computer network comprises a plurality of client devices associated with different users of said computer network, wherein the predefined backup data and/or the backup data stored onto at least one backup server comprises data to create at least one digital communication room allowing at least two of said different users to digitally communicate with each other.

10. Computer-implemented system according to any of the preceding clauses, wherein the predefined backup data and/or the backup data stored onto at least one backup server comprises data to create a fallback website associated with said customer.

11. Computer-implemented system according to any of the preceding clauses, wherein the predefined backup data and/or the backup data stored onto at least one backup server comprises data comprising said working environment installation instructions.

12. Computer-implemented system according to any of the preceding clauses, wherein at least a part of the backup data is stored in a compressed manner.

13. Computer-implemented system according to any of the preceding clauses, wherein at least a part of the backup data is stored in an encrypted manner.

14. Computer-implemented system according to any of the preceding clauses, wherein at least a part of at least one the emergency switch is a physical switch, in particular a physical button.

15. Computer-implemented system according to any of the preceding clauses, wherein at least a part of at least one the emergency switch is a virtual switch.

16. Computer-implemented system according to any of the preceding clauses, wherein system comprises at least one first digital break-glass access token stored in at least one break-glass file, preferably in a customer's computer network, required to switch the emergency switch.

17. Computer-implemented system according to any of the preceding clauses, wherein at least one, preferably each, emergency switch is programmed to be switched when subjected to at least two predefined activation steps 18. Computer-implemented system according to clause 16 and 17, wherein at least one predefined activation step is defined by exposing the switch to at least one first digital break-glass access token.

19. Computer-implemented system according to clause 17 or 18, wherein at least one predefined activation step is defined by receiving at least one second digital break-glass access token stored and/or held by the customer, preferably at a distance from a first digital break-glass access token required to activate said switch.

20. Computer-implemented system according to one of clauses 17-19, wherein at least one predefined activation step is defined by physically switching said switch by at least one user, preferably at least one authorized user.

21. Computer-implemented system according to any of the preceding clauses, wherein at least one secure container of at least one backup server is initially digitally sealed and is merely accessibly by switching at least one emergency switch.

22. Computer-implemented system according to any of the preceding clauses, wherein the system, in particular the customer's computer network, is programmed to disconnect the data server and/or the sandbox environment after switching of at least one emergency switch.

23. Computer-implemented system according to any of the preceding clauses, wherein the system, in particular the customer's computer network, is programmed to issue at least one warning alert to users of the customer's computer network and/or to at least one predefined external party once the emergency switch is switched.

24. Computer-implemented system according to any of the preceding clauses, wherein the system, in particular customer's computer network, comprises at least one running Security Information and Event Management (SIEM) service and/or at least one running Security Operations Centre (SOC) service to monitor unusual network activity.

25. Computer-implemented system according to clause 24, wherein at least one SIEM service and/or at least one SOC service is/are configured to detect and stop insider cybersecurity threats, preferably one or more threats selected from the group consisting of: compromised user credentials, anomalous privilege escalation, malware, compromised user accounts, and encryption of large amounts of data by ransomware.

26. Computer-implemented system according to clause 24 or 25, wherein at least one SIEM service and/or at least one SOC service is/are configured issue a warning signal to at least one predefined user of the customer's computer network and/or to at least one external party in case of a detected cybersecurity threat.

27. Computer-implemented system according to any of clauses 24-26, wherein at least one SIEM service and/or at least one SOC service is/are configured to generate and/or release at least one part of an access token required to switch at least one emergency switch.

28. Computer-implemented system according to any of preceding clauses, wherein at least one emergency switch is programmed to be controlled by an external party, preferably upon an authenticated request of said customer.

29. Computer-implemented system according to any of preceding clauses, wherein the customer's computer network and the fallback tenant are isolated from each other.

30. Computer-implement method for recovering data in case of a computer network failure, preferably by making use of a system according to any of the preceding clauses, comprising the steps of:
  A) Predefining backup data of data stored on at least one data server of a customer's computer network,
  B) Investigating the safety of said predefined backup data in a sandboxed environment,
  C) Copying the predefined backup data which are investigated and safety approved during step B) to at least one backup server of at least one fallback tenant,
  D) Providing at least one emergency switch,
  E) Allowing, preferably conditionally, said customer and/or said customer's computer network to switch at least one emergency switch,
  F) Following switching of at least one emergency switch executing working environment installation instructions stored on at least one non-transitory computer-readable program storage device of said fallback tenant to cause at least one processor of said fallback tenant to automatically build a new digital working environment for the customer, at least partially based upon the predefined backup data stored on at least one backup server, and
  G) Giving the customer, preferably one or more client devices of said customer, access to said new digital working environment.

31. Computer-implemented method according to clause 30, wherein during step A) predefined backup data instructions associated with backup data to be stored on at least one backup server of at least one customer's fallback tenant are stored on at least one non-transitory computer-readable program storage device, preferably of the customer's computer network, which when executed, cause the at least one processor to copy and transmit at least a part of the predefined backup to said at least one sandboxed environment.

32. Computer-implemented method according to clause 31, wherein during step A) said backup data instructions are stored on a preparatory server which is separated from said data server.

33. Computer-implemented method according to 32, wherein during step A) at least client device and/or at least one user of the customer's computer network has controlled access to at least a part of the preparatory server, preferably based upon prior user authentication.

34. Computer-implemented method according to any of clauses 30-33, wherein the backup data predefined during step A) and/or the backup data stored onto at least one backup server during step C) comprises data to build and/or install at least one operating system (OS) and/or at least one virtual machine (VM) emulating at least one operating system.

35. Computer-implemented method according to any of clauses 30-34, wherein the backup data predefined during step A) and/or the backup data stored onto at least one backup server during step C) comprises data to build and/or install at least one user application, such as word processing software, a spreadsheet, a presentation program, a personal information manager, a personal task manager, a personal contact manager, an email client, at least one web browser, and/or anti-malware software.

36. Computer-implemented method according to any of clauses 30-35, wherein the backup data predefined during step A) and/or the backup data stored onto at least one backup server during step C) comprises user files.

37. Computer-implemented method according to any of clauses 30-36, wherein the customer's computer network comprises a plurality of client devices, wherein the backup data predefined during step A) and/or the backup data stored onto at least one backup server during step C) comprises client device access related data determining access rights of said plurality of client device to access the new digital working environment once built.

38. Computer-implemented method according to any of clauses 30-37, wherein the customer's computer network comprises a plurality of client devices associated with different users of said computer network, wherein the backup data predefined during step A) and/or the backup data stored onto at least one backup server during step C) comprises data to create at least one digital communication room allowing at least two of said different users to digitally communicate with each other.

39. Computer-implemented method according to any of clauses 30-38, wherein the backup data predefined during step A) and/or the backup data stored onto at least one backup server during step C) comprises data to create a fallback website associated with said customer.

40. Computer-implemented method according to any of clauses 30-39, wherein during step C) at least a part of the backup data is stored in a compressed and/or encrypted manner.

41. Computer-implemented method according to any of clauses 30-40, wherein at least a part of at least one the emergency switch provided during step D) is a physical switch, in particular a physical button, and/or wherein at least a part of at least one the emergency switch provided during step D) is a virtual switch.

42. Computer-implemented method according to any of the preceding clauses, wherein the system comprises at least one first digital break-glass access token stored in at least one break-glass file and/or break-glass database, preferably in a customer's computer network, required to switch the emergency switch during step E) and/or to activate the fallback tenant during step F), wherein step F) optionally takes place without prior step E) to have taken place.

43. Computer-implemented method according to any of clauses 30-42, wherein during step E) at least one, preferably each, emergency switch is programmed to be switched and/or wherein during step F) at least one fallback tenant is activated to build the new working environment, when subjected to at least two predefined activation steps.

44. Computer-implemented method according to clause 42 and 43, wherein at least one predefined activation step is defined by exposing the switch to at least one first digital break-glass access token.

45. Computer-implemented method according to clause 43 or 44, wherein at least one predefined activation step is defined by receiving at least one second digital break-glass access token stored and/or held by the customer, preferably at a distance from a first digital break-glass access token required to activate said switch.

46. Computer-implemented method according to one of clauses 43-45, wherein at least one predefined activation step is defined by physically switching said switch by at least one user, preferably at least one authorized user.

47. Computer-implemented method according to any clauses 43-46, wherein at least one secure data container of at least one backup server is initially digitally sealed, preferably during step C), and is merely accessibly by switching at least one emergency switch during step E).

48. Computer-implemented method according to any of clauses 30-47, wherein switching the emergency switch during step E) is at least partially triggered by monitored unusual behaviour of and/or on the data server, like a ransomware attack on the data server and/or a power failure of the data server.

49. Computer-implemented method according to any of clauses 30-47, wherein during or after step E), the one or more client devices are disconnected from the data server and/or from the sandbox environment.

50. Computer-implemented method according to any of clauses 30-48, wherein the customer's computer network is programmed to issue, during and/or after step E), at least one warning alert to users of the customer's computer network and/or to at least one predefined external party once the emergency switch is switched.

51. Computer-implemented method according to any of clauses 30-49, wherein the method comprises step H) comprising detecting insider cybersecurity threats and/or unusual network activity on the customer's computer network, in particular on and/or of the data server, and/or within the newly built working environment after step F), by means of at least one Security Information and Event Management (SIEM) service and/or at least one Security Operations Centre (SOC) service. preferably running on said customer's computer network, wherein, preferably, one or more monitored threats is/are selected from the group consisting of: compromised user credentials, anomalous privilege escalation, malware, compromised user accounts, and encryption of large amounts of data by ransomware.

52. Computer-implemented method according to clause 51, wherein during step H) at least one SIEM service and/or at least one SOC service issues at least one warning signal to at least one predefined user of the customer's computer network and/or to at least one external party in case of a detected cybersecurity threat.

53. Computer-implemented method according to any of clauses 51-52, wherein during step H) at least one SIEM service and/or at least one SOC service generates and/or releases at least one part of an access token required to switch at least one emergency switch during step E).

54. A non-transitory program computer-readable storage device, comprising computer readable instructions executable by one or more processors to perform the computer-implemented method according to any of clauses 30-53 and/or for use in a computer-implemented system according to any of clauses 1-29.

The invention will be further elucidated by several non-limitative embodiments according to the present invention, wherein.

Figure 1:
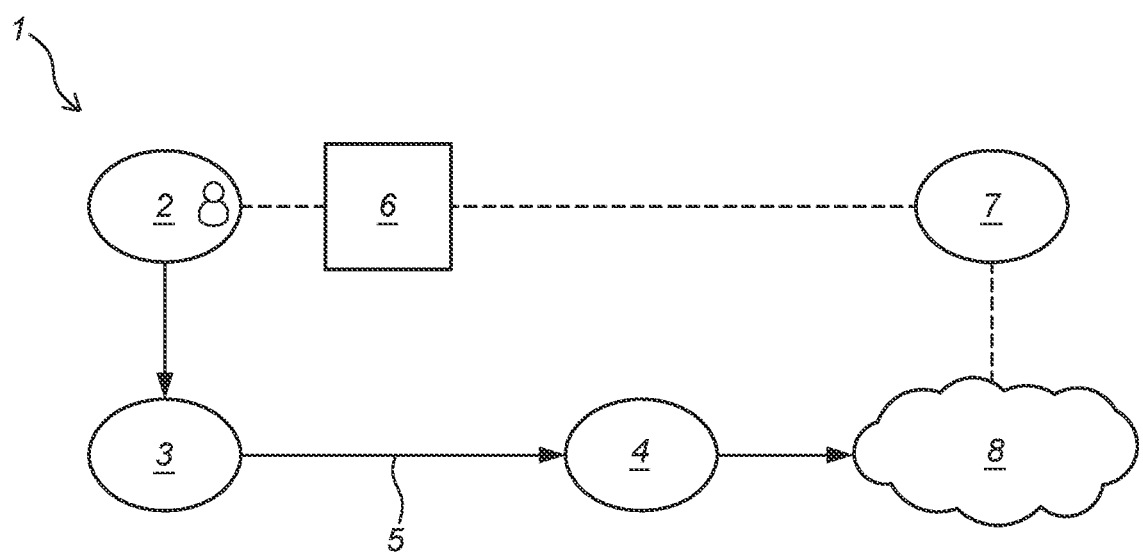
FIG. 1 shows a block diagram of an exemplary computer-implemented system according to the present invention.

FIG. 1 shows a block diagram of an example of a computer-implemented system 1 according to the present invention. FIG. 1 shows a healthy situation where a customer 2 has access to the customer's computer network 3. The customer's computer network 3 can allow the exchange of data between customers. It is also imaginable that the customer's computer network 3 allows to share resources between interconnected client devices. The customer's computer network 3 has a data server that stores backup data. This backup data is predefined data such as essential business data and/or valuable assets. The backup data is copied from the customers computer network 3 to a fallback tenant 4. It is imaginable that the backup data is encrypted during transport from the customers computer network 3 to the fallback tenant 4. A sandbox environment 5 is situated between the customers computer network 3 and the fallback tenant 4. The sandbox environment 5 investigates the safety of the backup data copied from the customer's computer network 3 to the fallback tenant 4. Consequently, the sandbox environment 5 transmits safety approved backup data to the fallback tenant 4. Preferably, the sandbox environment 5 only transmits safety approved backup data to the fallback tenant 4. It is imaginable, that the sandbox environment 5 is capable of removing malicious code present in the backup data. The fallback tenant 4 comprises an inoperative backup server that is configured to store the safety approved backup data. The fallback tenant 4 further may comprise at least one processor and/or is configure to co-act (communicate) with at least one external processor. Preferably, the fallback tenant 4 comprises at least one non-transitory computer-readable program storage device, such as a server, configured to store working environment installation instructions. The computer-implemented system 1 further has an emergency switch 6. The emergency switch 6 is controllable by the customer 2 and/or the customer's computer network 3. The emergency switch 6 is configured to execute the working environment installation instructions of the program storage device of the fallback tenant 4. This causes that the processor of the fallback tenant 4 automatically builds a new digital working environment 8. This new working environment 8 is based upon the backup data received from the backup server of the fallback tenant 4. Meaning that after switching the emergency switch 6, the inoperative backup server becomes operative to supply the fallback tenant 4 with backup data. It is imaginable that this new working environment 8 is built within one hour. The customer 2 is given access via at least one access token 7 to the new digital working environment 8.

Figure 2:
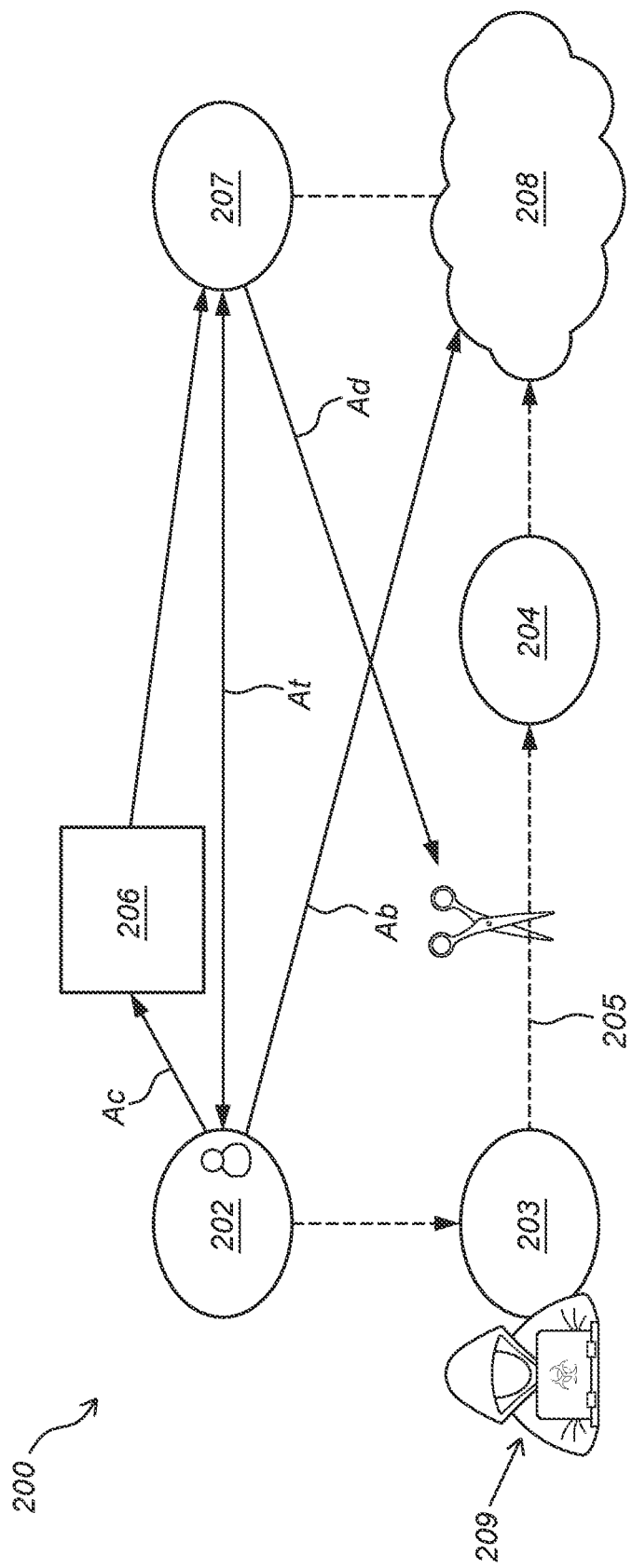
FIG. 2 shows a block diagram of an example of a computer-implemented method for recovering data.

FIG. 2 shows a block diagram of an example of a computer-implemented system 200 for recovering data during computer network failure. In a healthy situation, such as described in FIG. 1, a customer 202 has access to its computer network 203. The customer's computer network 203 has a data server that stores backup data. The backup data is copied from the customer's computer network 203 to a fallback tenant 204. A sandbox environment 205 is situated between the customer's computer network 203 and the fallback tenant 204. The sandbox environment 205 investigates the safety of the backup data copied from the customer's computer network 203 and transmits safety approved backup data to the fallback tenant 204. The fallback tenant 204 comprises a backup server that is configured to store the safety approved backup data. The fallback tenant 204 further comprises at least one processor and a non-transitory computer-readable program storage device configured to store working environment installation instructions. FIG. 2 shows a situation wherein the customer's computer network 203 is attacked, for example by a ransomware attack 209. As a consequence of this attack, a computer network failure occurs. As a response thereon, a protocol can be started to activate the fallback tenant 204 to build a new working environment 208. Various options are imaginable to activate the fallback tenant 204. It is, for example, imaginable that the fallback tenant 204 is activated by manually and/or automatically switching at least one emergency switch 206. Manually switching of at least one emergency switch 206 may be performed by the customer 202 and/or by an authorized service provider, preferably an authorized service provider hosting the fallback tenant 204. Switching the switch 206 may be subjected to a so-called "break-glass" protocol requiring a plurality of handlings and/or tokens to be able to switch the switch 206. Alternatively or additionally, the fallback tenant 204 may also be activated without using the switch and by executing an emergency protocol and/or a(nother) "break-glass protocol requiring a plurality of handlings and/or tokens to force access to the fallback tenant. These handlings may require action from a plurality of persons. The tokens may be stored and/or generates at different places and/or may be controlled by different persons, for example both the customer and at least one authorized service provider. The protocol starts with the activation Ac of the emergency switch 206 by the customer 202. The emergency switch 206 can manually be activated Ac by the customer 202. It is also imaginable that the emergency switch 206 is automatically activated, for example by a SIEM and/or SOC service, which is preferably running on the customer's computer network 203 and/or hosted by an external service provider, and/or which is activated by observed malicious code in the backup data observed by the sandbox environment 205. The emergency switch 206 can be a physical switch such as a button. It is also imaginable that the emergency switch 206 is a virtual switch. The customer 202 activates Ac the emergency switch 206 by exposing the emergency switch 206 to at least one first digital break-glass access token. This first break-glass access token can for example be stored in a break-glass file. In this example, a second digital break-glass access token is received At. This second break-glass token can be stored and/or held by the customer 202, preferably at a distance from a first digital break-glass access token required to activate the emergency switch 206. One digital break-glass access token is used by the customer 202 and the other digital break-glass access token may be stored for example in a secure storage container to which the customer 202 and/or the customer's computer network 203 and/or an authorized service provider 207 has or can gain access to. This "break glass" protocol, comprising two handlings to switch the emergency switch 206. Consequently, the fallback tenant 204 is activated to build the new working environment 208. To build the new working environment 208 the working environment installation instructions of the program storage device of the fallback tenant 204 are activated due to switching of the emergency switch 206. This causes that the processor of the fallback tenant 204 builds a new working environment 208. The customer 202 consequently gains access Ab to the new working environment 208. This new working environment 208 is based upon backup data received from the backup server of the fallback tenant 204. In order to build a new working environment 208 without malicious code or infected data, the backup data is no longer copied from the customer's computer network 203 to the fallback tenant 204. Instead, after switching the emergency switch 206 the customer's computer network 203 and/or the emergency switch 206 and/or the fallback tenant 204 and/or a system of an authorized external service provider is programmed to disconnect data server(s) Ad and/or the sandbox environment 205 as well as to activate the fallback tenant 204 to build, in isolation, the new working environment 208. The new working environment 208 may be a fully operational environment, but may also be a basic working environment with basic functionality to continue the business at a basic level, while preferably recreating a fully operational environment in the background. This latter background process may take weeks, typically between 10 and 12 weeks. The new working environment 208 is preferably a temporary working environment 208 and will deactivated and/or removed and/or cleaned once the original customer's working environment has been cleaned and restored entirely and is fully operationally again. Once the original environment is restored and fully operational, the customer typically switches from the (temporary) working environment back to the restored, original computer network. After this back-switch, the working environment which was built from the fallback tenant may be wiped, and/or cleaned, and/or removed, and/or deactivated.

The creation of a basic working environment saves storage space and hence cost and normally also saves time to build/create this basic environment compared to a fully operational environment.

Figure 3:
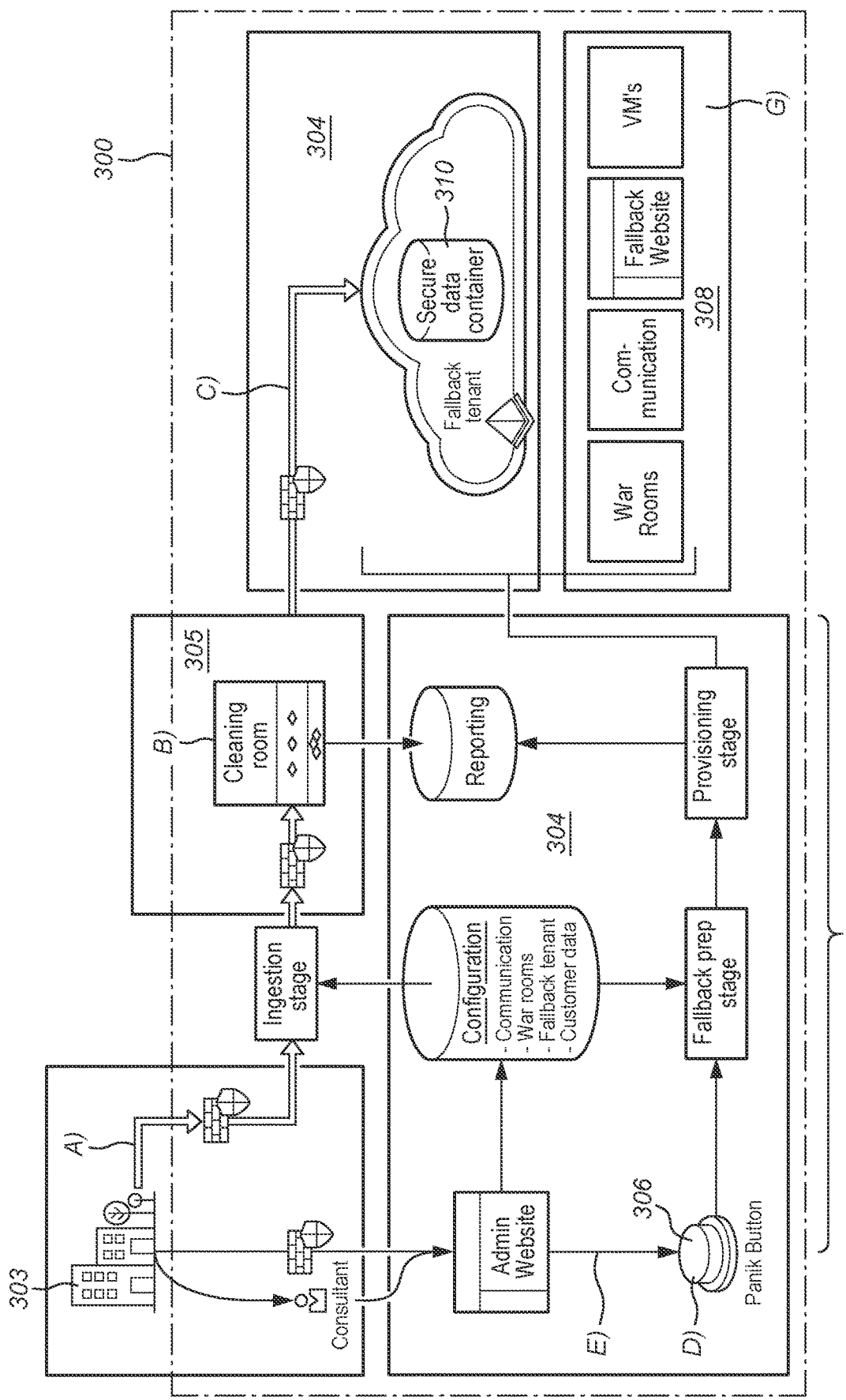
FIG. 3 shows a block diagram of an example of components of an exemplary computer-implemented system according to the present invention.

FIG. 3 shows a block diagram of an example of components of an exemplary computer-implement method 300 for recovering data in case of a computer network failure according to the present invention. The method starts with predefining backup data A) of data stored on a data server of the customer's computer network 303. The backup data is optionally encrypted copied to a sandbox environment 305. It is imaginable that during step A) predefined backup data instructions associated with backup data are stored on at least one non-transitory computer-readable program storage device of the fallback tenant 304. It is imaginable that a processor, preferably a processor of the customer's computer network and/or an (authorized) external processor, causes to copy and transmit at least a part of the predefined backup to the sandboxed environment 305. The sandbox environment 305 investigates the safety of the predefined backup data during step B). The sandbox environment 305 comprises a "so-called" cleaning room. The cleaning room examines the backup data on malicious code. It is imaginable that the sandbox environment 305 removes unwanted code from the backup data. After investigating the backup data, the safety approved backup data is copied to a backup server of the fallback tenant 304 during step C). It is imaginable, that during step C) the data is stored in a compressed and/or encrypted manner. The method further includes the providing of at least one emergency switch 306 during step D). This emergency switch 306 can be a physical switch such as a button. It is however also imaginable that the emergency switch 306 is a virtual switch. In case of network failure and/or a ransomware attack, the customer and/or the customer's computer network 303 is allowed to switch the emergency switch 306 during step E). It is imaginable that a digital break-glass access token is required to switch the emergency switch 306 during step E). This break-glass access token can for example be stored in a break-glass file and/or break-glass database in the customer's computer network 303. The emergency switch 306 can be programmed to be switched when subjected to at least two predefined activation steps as depicted in FIG. 2. It is further imaginable, that on the customer's computer network 303 a SIEM service and/or a SOC service is running and/or the customer's computer network 303 is monitored by an external SIEM service and/or external SOC service, that issues for example a warning signal to a predefined user of the customer's computer network 303 and/or to at least one external party in case of a detected cybersecurity threat. The SIEM and/or SOC service could further for example generate and/or release an access token required to switch the emergency switch 306 during step E). The secure data container 310 of the backup server of the fallback tenant 304 can be initially digitally sealed during step C). The secure data container 310 can become accessibly by switching at least one emergency switch 306 during step E). Further, during or after step E), client device(s) can be disconnected from the data server, in particular in case of a ransomware attack is detected and/or observed by the customer and/or the customer's computer network 303 and/or an authorized service provider. Following the switching of the emergency switch 306 a series of processes is followed to build a new working environment 308 during step F). During step F) the working environment installation instructions are executed. These working environment installation instructions are stored on at least one non-transitory computer-readable program storage device, such as a backup server or alternative storage medium, of the fallback tenant 304. The execution of the working environment installation instructions causes at least one processor of the fallback tenant 304 to automatically build a new digital working environment 308 for the customer. This new working environment 308 is at least partially based upon the predefined backup data stored on at least one backup server. Finally, during step G) the customer, preferably one or more client devices the customer, is given access to the new digital working environment 308. It is imaginable that the backup data predefined during step A) and/or the backup data stored onto at least one backup server during step C) comprises data to build and/or install at least one operating system (OS) and/or at least one virtual machine (VM) emulating at least one operating system. It is further imaginable that the backup data comprises data to build and/or install user application(s), user files, communication rooms allowing for different users to digitally communicate, and/or a fallback website.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application. It is explicitly emphasized here that all mathematical combinations are possible among the features mentioned above and referred to in the claims as filed, as far as the respectively obtained combination does not include any contradictory characteristics. In this manner, this application thus also forms a reservoir of possibilities of claimed subject-matter.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A computer-implemented system for recovering data in case of a computer network failure, comprising:
   at least one computer network of a customer, said computer network comprising at least one data server and at least one client device configured to connect with said data server,
   at least one fallback tenant associated with said customer, comprising:
      at least one backup server configured to store in at least one secure data container predefined backup data initially stored on said data server, and
      at least one non-transitory computer-readable program storage device storing working environment installation instructions which when executed, cause at least one processor to automatically build a new digital working environment for said customer, based upon and/or giving access to at least a part of the backup data stored on the backup server,
   at least one sandboxed environment situated in between the customer's computer network and the fallback tenant to investigate the safety of backup data and to transmit safety approved backup data to at least one fallback tenant for storing of said safety approved backup data onto at least one backup server of said at least one fallback tenant, and
   at least one emergency switch controllable by said customer and/or the customer's computer network, in particular in case of a customer's computer network failure and/or in case of a customer's data server failure, configured to execute the working environment installation instructions of the at least one fallback tenant of said customer, causing the at least one processor of said fallback tenant to automatically build a customer accessible new digital working environment based upon and/or giving customer access to at least a part of the backup data stored on the backup server,
   wherein the new digital working environment is separate from and independent of the at least one computer network of the customer.

2. The computer-implemented system according to claim 1, wherein the customer's computer network comprises at least one processor and at least one non-transitory computer-readable program storage device storing predefined backup data instructions associated with backup data to be stored on at least one backup server of at least one customer's fallback tenant, which when executed, cause the at least one processor to copy and transmit at least a part of the predefined backup data to said at least one sandboxed environment.

3. The computer-implemented system according to claim 2, wherein the backup data instructions are stored on a preparatory server which is separated from said data server.

4. The computer-implemented system according to claim 1, wherein the predefined backup data and/or the backup data stored onto at least one backup server comprises data to build and/or install at least one operating system (OS) and/or at least one virtual machine (VM) emulating at least one operating system.

5. The computer-implemented system according to claim 1, wherein system comprises at least one first digital break-glass access token stored in at least one break-glass file required to switch the emergency switch.

6. The computer-implemented system according to claim 1, wherein at least one, preferably each, emergency switch is programmed to be switched when subjected to at least two predefined activation steps.

7. The computer-implemented system according to claim 1, wherein at least one secure container of at least one backup server is initially digitally sealed and is merely accessibly by switching at least one emergency switch.

8. The computer-implemented system according to claim 1, wherein the system is programmed to disconnect the data server and/or the sandbox environment after switching of at least one emergency switch.

9. The computer-implemented system according to claim 1, wherein the system, in particular the customer's computer network, is programmed to issue at least one warning alert to users of the customer's computer network and/or to at least one predefined external party once the emergency switch is switched.

10. The computer-implemented system according to claim 1, wherein the system, in particular customer's computer network, comprises at least one running Security Information and Event Management (SIEM) service and/or at least one running Security Operations Centre (SOC) service to monitor unusual network activity.

11. The computer-implemented system according to claim 1, wherein at least one STEM service and/or at least one SOC service is/are configured to detect and stop insider cybersecurity threats.

12. The computer-implemented system according to claim 1, wherein the customer's computer network and the fallback tenant are isolated from each other.

13. Computer A computer-implement method for recovering data in case of a computer network failure, preferably by making use of a system according to claim 1, comprising the steps of:
A) Predefining backup data of data stored on at least one data server of a customer's computer network,
B) Investigating the safety of said predefined backup data in a sandboxed environment,
C) Copying the predefined backup data which are investigated and safety approved during step B) to at least one backup server of at least one fallback tenant,
D) Providing at least one emergency switch,
E) Allowing, preferably conditionally, said customer and/or said customer's computer network to switch at least one emergency switch,
F) Following switching of at least one emergency switch executing working environment installation instructions stored on at least one non-transitory computer-readable program storage device of said fallback tenant to cause at least one processor of said fallback tenant to automatically build a new digital working environment for the customer, at least partially based upon the predefined backup data stored on at least one backup server, wherein the new digital working environment is built separately and independently of the customer's computer network, and
G) Giving the customer, preferably one or more client devices of said customer, access to said new digital working environment.

14. The computer-implemented method according to claim 13, wherein during step A) predefined backup data instructions associated with backup data to be stored on at least one backup server of at least one customer's fallback tenant are stored on at least one non-transitory computer-readable program storage device which when executed, cause the at least one processor to copy and transmit at least a part of the predefined backup to said at least one sandboxed environment.

15. The computer-implemented method according to claim 13, wherein the backup data predefined during step A) and/or the backup data stored onto at least one backup server during step C) comprises data to build and/or install at least one operating system (OS) and/or at least one virtual machine (VM) emulating at least one operating system.

16. The computer-implemented method according to claim 13, wherein the system comprises at least one first digital break-glass access token stored in at least one break-glass file and/or break-glass database required to switch the emergency switch during step E) and/or to activate the fallback tenant during step F), wherein step F) optionally takes place without prior step E) to have taken place.

17. The computer-implemented method according to claim 13, wherein during step E) at least one, preferably each, emergency switch is programmed to be switched and/or wherein during step F) at least one fallback tenant is activated to build the new working environment, when subjected to at least two predefined activation steps.

18. The computer-implemented method according to claim 13, wherein switching the emergency switch during step E) is at least partially triggered by monitored unusual behaviour of and/or on the data server, like a ransomware attack on the data server and/or a power failure of the data server.

19. The computer-implemented method according to claim 13, wherein the method comprises step H) comprising detecting insider cybersecurity threats and/or unusual network activity on the customer's computer network, in particular on and/or of the data server, and/or within the newly built working environment after step F), by means of at least one Security Information and Event Management (SIEM) service and/or at least one Security Operations Centre (SOC) service.

20. A non-transitory program computer-readable storage device, comprising computer readable instructions executable by one or more processors to perform the computer-implemented method for recovering data in case of a computer network failure, preferably by making use of a computer-implemented system according to claim 1, comprising the steps of:
A) Predefining backup data of data stored on at least one data server of a customer's computer network,
B) Investigating the safety of said predefined backup data in a sandboxed environment,
C) Copying the predefined backup data which are investigated and safety approved during step B) to at least one backup server of at least one fallback tenant,
D) Providing at least one emergency switch, E) Allowing, preferably conditionally, said customer and/or said customer's computer network to switch at least one emergency switch, F) Following switching of at least one emergency switch executing working environment installation instructions stored on at least one non-transitory computer-readable program storage device of said fallback tenant to cause at least one processor of said fallback tenant to automatically build a new digital working environment for the customer, at least partially based upon the predefined backup data stored on at least one backup server, wherein the new digital working environment is built separately and independently of the customer's computer network, and G) Giving the customer, preferably one or more client devices of said customer, access to said new digital working environment; and/or for use in a computer-implemented system for recovering data in case of a computer network failure, comprising:

at least one computer network of a customer, said computer network comprising at least one data server and at least one client device configured to connect with said data server, at least one fallback tenant associated with said customer, comprising:

at least one backup server configured to store in at least one secure data container predefined backup data initially stored on said data server, and at least one non-transitory computer-readable program storage device storing working environment installation instructions which when executed, cause at least one processor to automatically build a new digital working environment for said customer, based upon and/or giving access to at least a part of the backup data stored on the backup server, at least one sandboxed environment situated in between the customer's computer network and the fallback tenant to investigate the safety of backup data and to transmit safety approved backup data to at least one fallback tenant for storing of said safety approved backup data onto at least one backup server of said at least one fallback tenant, and at least one emergency switch controllable by said customer and/or the customer's computer network, in particular in case of a customer's computer network failure and/or in case of a customer's data server failure, configured to execute the working environment installation instructions of the at least one fallback tenant of said customer, causing the at least one processor of said fallback tenant to automatically build a customer accessible new digital working environment based upon and/or giving customer access to at least a part of the backup data stored on the backup server.

\* \* \* \* \*